2,853,425
PREPARATION OF ALDOSTERONE FROM OXYGENATED GLANDS

Albert Wettstein and Friedrich Kahnt, Basel, and Robert Neher, Binningen, Switzerland, assignors to Ciba Pharmaceutical Products, Inc., Summit, N. J.

No Drawing. Application November 2, 1954
Serial No. 466,431

Claims priority, application Switzerland November 6, 1953

7 Claims. (Cl. 195—51)

In the application of Tadeus Reichstein, Albert Wettstein and Robert Neher, Ser. No. 444,657, filed July 20, 1954, and in the article by S. A. Simpson, J. F. Tait, A. Wettstein, R. Neher, J. V. Euw, O. Schindler and T. Reichstein: Helv. Chim. Acta, vol. 37, 1954, pages 1163–1200, there are described various methods for the preparation and isolation from suprarenal glands of a highly active chemically homogeneous new corticoid affecting the mineral metabolism, originally called electrocortin and now known as aldosterone. The preparation of this new hormone from suprarenal glands, however, is very difficult on account of the low yields obtained.

According to the present invention, it has been found that the yield of aldosterone can be increased by at least 10–20 times by first treating the disintegrated suprarenal glands with oxygen and then isolating the aldosterone in the free form or in the form of a functional derivative thereof.

As disintegrated suprarenal gland material there is used, for example, that obtained by homogenizing or cutting up suprarenal glands from beef cattle or pigs. The homogenization is advantageously carried out in the cold, for example about 0° C. to about 5° C., in the presence of a suitable buffer solution and at approximately constant pH value, especially within a range of about pH 6.5 and pH 9. In order to obtain a further increase in the yield of aldosterone, cortexone (11-desoxycorticosterone) can be added to the disintegrated suprarenal gland material, such as the homogenizate.

The enzyme systems of the suprarenal glands important for the reaction can be kept operative by the addition of a suitable substratum and maintaining corresponding conditions in the medium. As substrata there may be used, more especially, those of the cyclophorase system and/or compounds belonging to the citric acid cycle or closely allied compounds, for example, citric acid, aconitic acid, isocitric acid, oxal-succinic acid, $\alpha$-keto-glutaric acid, succinic acid, fumaric acid, malic acid, pyroracemic acid, oxal-acetic acid, and also malonic acid, glutaric acid, adipic acid, glutaminic acid, asparaginic acid, asparagin, alanine, glycocol, serine, and also ascorbic acid, lactic acid, dioxytartaric acid, proline, tyrosine, tryptophane, or mixtures of these substances. There are also especially suitable further additions of adenosine-triphosphoric acid, adenosine-diphosphoric acid, triphospho-pyridine-nucleotid and diphospho-pyridine-nucleotid, nicotinic acid amide, adenine, adenosine and adenylic acid.

In order to maintain the activity of the enzymes an aqueous medium is used, to which it is of advantage to add constituents of physiological solutions, such as carbohydrates, inorganic and/or organic salts, for example, sodium phosphate, an alkali chloride or magnesium sulphate. By means of the addition of salt, especially the pH value and the ion concentration of the reaction solution are maintained within an optimum range during the reaction; i. e. the reaction is advantageously carried out at a pH value of 6.5 to 9.0 and a molar salt concentration of 0.5 to 0.01. Accordingly, there may be used as reaction medium a physiological liquid, for example, plasma. In this case it is of advantage to add a preservative, for example, penicillin.

For the treatment with oxygen there may be passed over or through the reaction mixture pure oxygen or a gaseous mixture containing oxygen, such as air, at a rate 0.5 to 5 liters per minute per 750 ml. reaction mixture for 1 to 5 hours or more. Furthermore, the reaction mixture may be shaken or stirred.

The isolation of the active substance from the reaction medium may be carried out, depending on the starting materials and/or reaction media used, according to the methods described in the aforesaid application Ser. No. 444,657, or article.

In general, the process for isolating aldosterone comprises the following: the reaction mixture is diluted with acetone, filtered, the filtrate freed from acetone and extracted by known methods with the aid of lipoid solvents and the extract is separated by distribution between an aqueous solvent and a solvent immiscible with water and/or by chromatography, if desired, in conjunction with purification by the method of Girard [Helv. Chim. Acta, 19, 1095 (1936)] to recover the ketonic portion, and then isolating the active substance (aldosterone) by crystallization from the resulting fractions which are highly active especially in the metabolism of mineral substances.

In an analogous manner the active substance may also be isolated in the form of a functional derivative thereof, for example a diester or a monoester obtained by partial acylation or partial hydrolysis, ethers or carbonyl derivatives, as described in U. S. application Ser. No. 454,834, filed September 8, 1954. The following examples illustrate the invention:

Example 1

243 grams of beef suprarenal glands from freshly slaughtered cattle are homogenized with 550 cc. of an ice-cold aqueous solution in a homogenizer for 5 minutes. The solution used contains, per liter, 3.63 grams of sodium chloride, 1.86 grams of potassium chloride, 3.65 grams of secondary sodium phosphate, 0.98 gram of magnesium sulphate, 18 grams of glucose, 6.4 grams of sodium fumarate, 3 grams of nicotinic acid amide, and is adjusted to a pH value of 7.50. During the homogenization the pH value is prevented from falling below 7.3 by the addition of a 1 N-solution of caustic soda. The emulsion is discharged into a vessel provided with a stirrer and a gas inlet tube, and allowed to stand for 3½ hours at 30° C., while stirring and introducing oxygen, at a rate of 3 liters per minute for 4 hours. The pH value is measured throughout the reaction by means of a glass electrode and maintained constant between 7.3 and 7.5. The reaction mixture is then introduced into 5 liters of cold acetone and subsequently washed twice with 250 cc. of acetone on each occasion. The solution is allowed to stand for 16 hours in the cold during which it is occasionally stirred, and then the mixture is filtered with suction. The residue is washed with 500 cc. of acetone, and the combined acetone solutions are evaporated to about 200 cc. under a vacuum produced by a water jet and at a bath temperature of 40–45° C.

The fat suspension which remains behind is extracted four times with 5 cc. of petroleum ether (boiling at 50–70° C.), and then three times with 100 cc. of freshly distilled ethylene chloride during which any emulsions or suspensions formed are occasionally broken by centrifuging. After distilling off the dried ethylene chloride solutions 191.1 mg. of a residue remain behind. The extract is dissolved in methylene chloride, and subjected to chromatographic adsorption over silica gel. 5 grams of silica gel are suspended in methylene chloride and charged into a suitable column. The above mentioned extract solution is first added, and elutriation is carried out successively with methylene chloride (3 fractions), chloroform (5 fractions), chloroform-acetone 9:1 (4 fractions), 1:1 (4 fractions) and acetone (2 fractions) (10 cc. per fraction). The individual fractions are then examined by paper chromatography for their content of corticosteroids. All the fractions containing cortisone and 17-hydroxycorticosterone (12–16) are combined (24.5 mg.) and rechromatographed on a wide cellulose sheet (Whatman No. 1) with the system methanol-water-ethylacetate-toluene (5:5:1:9), the individual ultraviolet-absorbing bands in the sheet chromatograph being rendered visible by means of ultraviolet photocopies. The band corresponding to 17-hydroxycorticosterone which also contains the aldosterone, is cut out, thoroughly elutriated with methanol of 20 percent strength, and the elutriate, after being concentrated in vacuo to three quarters of its original volume, is extracted 10 times with the same volume of a purified mixture of ether and chloroform (3:1). From the extract (4.6 mg.) obtained by drying and evaporation in vacuo, 500 $\gamma$ are paper chromatographed in the system propylene glycol-toluene for 24 hours, whereby the aldosterone is separated from 17-hydroxycorticosterone and can be identified by its ultraviolet absorption capacity at 240 m$\mu$ and its capacity for reducing silver diamine or blue tetrazolium in a definite place in the chromatogram ($R_F$-value about the same as that of cortisone) under these conditions. The ultraviolet absorption and reduction capacities both of a standard substance such as 17-hydroxycorticosterone and of the aldosterone are compared with one another and thereby the quantity of the latter is found to be semi-quantitative. Accordingly, 208–240 $\gamma$ of aldosterone are formed, which corresponds to an increase in yield amounting to approximately 10 times that obtained by the extraction of 243 grams of untreated suprarenal gland material.

In order to isolate the aldosterone the combined ether-chloroform extracts (26.3 mg.) from 5 batches are subjected to a preparative paper chromatography in the system propylene glycol-toluene (24 hours). The band of the aldosterone located by means of ultraviolet photocopies, is cut out, elutriated and extracted as described above. The extract (2.1 mg.) can be crystallized, after being dried in a high vacuum, from a mixture of acetone and ether and a trace of water. In this manner there is obtained 0.9 mg. of pure aldosterone having the double melting point 104 to 112° C. and 153–158° C. Further quantities can be recovered from the motor liquor.

*Example 2*

225 grams of beef suprarenal gland from freshly slaughtered cattle are homogenized with 550 cc. of an ice-cold aqueous solution in a homogenizer for 5 minutes. The solution used contains, per liter, 3.63 grams of sodium chloride, 1.86 grams of potassium chloride, 3.56 grams of secondary sodium phosphate, 0.98 gram of magnesium sulphate, 18 grams of glucose, 6.4 grams of sodium fumarate, 3 grams of nicotinic acid amide, 1 gram of sodium adenosine triphosphate and is adjusted to a pH value of 7.50. During the homogenization the pH value is prevented from falling below 7.3 by the addition of 1 N-solution of caustic soda. The emulsion is discharged into a vessel provided with a stirrer and gas inlet tube, and allowed to stand for 3 hours at 30° C. while stirring and introducing oxygen at a rate of 4 liters per minute for 3 hours. The pH value is measured throughout the reaction by means of a glass electrode and is maintained constant between 7.3 and 7.5. The reaction mixture is added to 5.5 liters of cold acetone and subsequently washed twice with 250 cc. of acetone on each occasion. The solution is allowed to stand in the cold for 16 hours during which it is occasionally stirred, and then the solution is filtered with suction. The residue is washed with 500 cc. of acetone and the combined acetone solutions are evaporated to about 200 cc. under a vacuum produced by a water jet at 40–45° C. bath temperature.

The further working up is carried out as described in Example 1. The ethylene chloride extract (736.7 mg.) is again defatted, by dissolving it in 40 cc. of ethanol of 95 percent strength and 40 cc. of petroleum ether and mixing the solution in succession with 2.2, 5.4 and 6.8 cc. of water, the petroleum ether solution separating out after each addition of water being removed and discarded.

The defatted extract (188 mg.) is chromatographed over silica gel (4 grams) as described in Example 1. Tthe corticosteroids, which are detected in the 11th–16th fractions (chloroform-acetone 9:1 and 1:1) and amount to a total of 38.7 mg. are acetylated with acetic anhydride in pyridine at 20° C., and preparatively chromatographed on paper by means of the system formamide-benzene-cyclohexane (1:1) at 40° C. The band corresponding to the acetate of the aldosterone (in about the same position as 11-dehydrocorticosterone acetate) is localized in the same manner as that described in Example 1, elutriated and extracted. The extract (3.6 mg.), is rechromatographed on paper in the system formamide-benzene and formamide-benzene-cyclohexane (1:1), and then the position of the acetate of aldosterone is determined by means of the indicators mentioned in Example 1. In this manner 220 $\gamma$ of the diacetate can be obtained, which is an increase in yield amounting to approximately 10 times as compared with the yield obtained by working up in an analogous manner 225 grams of untreated suprarenal gland material.

*Example 3*

250 grams of beef suprarenal gland from freshly slaughtered cattle are homogenized with 600 cc. of an ice-cold aqueous solution in a homogenizer for 5 minutes. The solution used has the composition of that used in Example 1. After homogenizing for one minute, 0.5 gram of sodium adenosine-triphosphate is added and homogenization is continued for a further 5 minutes. The pH value prevented from falling below 7.3 by the addition of a 1 N-solution of caustic soda. The emulsion is incubated in the manner described in Examples 1 and 2 for 3½ hours at 30° C. with oxygen, and the reaction mixture is subjected to extraction in an analogous manner.

There are obtained 251.4 mg. of ethylene chloride extract, which is chromatographed over 5 grams of silica gel. The 10th–16th fractions contain the corticosteroids (total 21.2 mg.). By elutriation and extraction of the 17-hydroxycorticosterone band of the sheet chromatogram (system methanol-water-ethyl acetate-toluene), there are obtained 4.1 mg. which contain 405 $\gamma$ of aldosterone. This represents an increase in yield of approximately 20 times compared with that obtained by extracting 250 grams of untreated suprarenal gland material.

*Example 4*

250 grams of beef suprarenal glands from freshly slaughtered cattle are homogenized with 550 cc. of an ice-cold aqueous solution in a homogenizer for 5 minutes. The solution used contains, per liter, 3.63 grams of sodium chloride, 1.86 grams of potassium chloride, 3.56 grams of secondary sodium phosphate, 0.98 gram of magnesium sulfate, 18 grams of glucose, 6.4 grams of sodium fumarate, 1 gram of sodium adenosine triphosphate, and its pH is adjusted to 7.50. During the homogenization the pH value is prevented from falling below 7.3 by the addition of a 1 N-solution of caustic soda. 0.125 gram of cortexone is mixed with the emulsion which is then charged into a vessel provided with a stirrer and a gas inlet tube, and allowed to stand for 3½ hours at 30° C. while stirring and introducing oxygen at a rate of 2 liters per minute for 6 hours. The pH value is measured throughout the reaction by means of a glass electrode and maintained constant between 7.3 and 7.5. The reaction mixture is then introduced into 5 liters of cold acetone and subsequently washed twice with 250 cc. of acetone on each occasion. The solution is then allowed to stand for 16 hours in the cold during which it is occasionally stirred, and then the mixture is filtered with suction. The residue is washed with 500 cc. of acetone, and the combined acetone solutions are evaporated to about 200 cc. under a vacuum produced by a water jet and at a bath temperature of 40–45° C.

The aqueous fat suspension which remains behind is extracted four times with 50 cc. of petroleum ether (boiling at 50–70° C.), and then three times with 100 cc. of freshly distilled ethylene chloride during which any emulsions or suspensions formed are occasionally broken by centrifuging. After distilling off the dried ethylene chloride solutions 75.3 mg. of a residue remain behind. This extract is defatted and chromatographed over silica gel (4 grams) as described in Example 1. The corticosteroids found in fractions 11–16 are combined (14.7 mg.) and rechromatographed on a wide cellulose sheet (Whatman No. 1) with the system methanol-water-ethyl acetate-toluene (5:5:1:9), the individual ultraviolet-absorbing bands in the sheet chromatogram being rendered visible by means of ultraviolet photocopies. The band corresponding to 17-hydroxy-corticosterone, which also contains aldosterone, is cut out, thoroughly elutriated with methanol of 20 percent strength, and the elutriate, after being concentrated in vacuo to three quarters of its original volume, is extracted 10 times with the same volume of a purified mixture of ether and chloroform (3:1). From the extract (6.1 mg.) obtained by drying and evaporation in vacuo, 250 γ are paper chromatographed in the system propylene glycol-toluene for 24 hours, whereby aldosterone is separated from 17-hydroxycorticosterone and can be identified by its ultraviolet absorption capacity at 240 mμ and its capacity for reducing silver diamine or blue tetrazolium in a definite place in the chromatogram ($R_F$-value about the same as that of cortisone under these conditions). The ultraviolet absorption and reduction capacities both of a standard substance such as cortisone (17-hydroxycorticosterone) and of aldosterone are compared with one another and thereby the quantity of the latter is found to be semi-quantitative. In 250 γ of extract there can be found in this way 33–36 γ of aldosterone, or 805–880 γ per 250 grams of suprarenal gland material, which corresponds to an increase in yield amounting to approximately 35–40 times that obtained by the extraction of 250 grams of untreated suprarenal gland material.

In order to isolate the aldosterone, the major portion of the extract (5.85 mg.) is subjected to a preparative paper chromatography in the system propylene glycol-toluene (24 hours). The band of the aldosterone located by means of ultraviolet photocopies, is cut out, elutriated and extracted as described above. The extract (1.2 mg.) can be crystallized, after being dried in a high vacuum, from a mixture of acetone and ether and a trace of water. In this manner there is obtained 0.55 mg. of the pure corticoid aldosterone having the double melting point 104–112° C. and 154–158° C. Further quantities can be recovered from the mother liquor.

*Example 5*

250 grams of beef suprarenal glands from freshly slaughtered cattle are homogenized with 550 cc. of an ice-cold aqueous solution in a homogenizer for 5 minutes. The solution used contains, per liter, 3.63 grams of sodium chloride, 1.86 grams of potassium chloride, 3.56 grams of secondary sodium phosphate, 0.98 gram of magnesium sulfate, 18 grams of glucose, 6.4 grams of sodium fumarate, 3 grams of nicotinic acid amide, 1 gram of sodium adenosine triphosphate, and its pH is adjusted to 7.5. During the homogenization the pH value is prevented from falling below 7.3 by the addition of 1 N-solution of caustic soda. 0.125 gram of cortexone is mixed with the emulsion which is then charged into a vessel provided with a stirrer and a gas inlet tube, and allowed to stand for 3½ hours at 30° C. while stirring and introducing oxygen at a rate of 5 liters per minute for 2 hours. The pH value is measured throughout the reaction by means of a glass electrode and maintained constant between 7.3 and 7.5. The reaction mixture is then introduced into 5 liters of cold acetone and subsequently washed twice with 250 cc. of acetone on each occasion. The solution is then allowed to stand for 16 hours in the cold during which it is occasionally stirred, and then the mixture is filtered with suction. The residue is washed with 500 cc. of acetone, and the combined acetone solutions are evaporated to about 200 cc. under a vacuum produced by a water jet and at a bath temperature of 40–45° C.

The aqueous fat suspension which remains behind is extracted four times with 50 cc. of petroleum ether (boiling at 50–70° C.) and then three times with 100 cc. of freshly distilled ethylene chloride during which any emulsions or suspensions formed are occasionally broken by centrifuging. After distilling off the dried ethylene chloride solutions 161.0 mg. of a residue remain behind. This extract is defatted and chromatographed over silica gel (7 grams) as described in Example 1. The corticosteroids found in fractions 11–16 are combined (21.3 mg.) and rechromatographed on a wide cellulose sheet (Whatman No. 1) with the system methanol-water-ethyl acetate-toluene (5:5:1:9), the individual ultraviolet-absorbing bands in the sheet chromatogram being rendered visible by means of ultraviolet photocopies. The band corresponding to 17-hydroxycorticosterone, which also contains the aldosterone, is cut out, thoroughly elutriated with methanol of 20 percent strength, and the elutriate, after being concentrated in vacuo to three quarters of its original volume, is extracted 10 times with the same volume of a purified mixture of ether and chloroform (3:1). From the extract (5.4 mg.) obtained by drying and evaportion in vacuo, 250 γ are paper chromatographed in the system propylene glycol-toluene for 24 hours, whereby the aldosterone is separated from 17-hydroxycorticosterone and can be identified by its ultraviolet absorption capacity at 240 mμ and its capacity for reducing silver diamine or blue tetrazolium in a definite place in the chromatogram ($R_F$-value about the same as that of cortisone under these conditions). The ultraviolet absorption and reduction capacities both of a standard substance such as 17-hydroxycorticosterone and of the aldosterone are compared with the one another and thereby the quantity of the latter is found to be semi-quantitative. In 250 γ of extract there can be found in this way 27–29 γ of the new corticoid, or 580–625 γ per 250 grams of suprarenal glands, which corresponds to an increase in yield amounting to approximately 25–30 times that obtained by the extraction of 250 grams of untreated suprarenal gland material.

What is claimed is:

1. In a process for the preparation of aldosterone by extraction from suprarenal glands, the improvement which comprises, prior to the extraction and isolation of aldosterone, the step of treating an aqueous suspension of the disintegrated suprarenal glands in the presence of buffer solutions at a pH range from about 6.5 to about 9.0 with oxygen in a medium containing a substratum which maintains operative the enzyme systems of said glands.

2. In a process for the preparation of aldosterone by extraction from suprarenal glands, the improvement which comprises, prior to the extraction and isolation of aldosterone, the step of treating an aqueous supension of the disintegrated suprarenal glands in the presence of buffer solutions at a pH range from about 6.5 to about 9.0 with oxygen in a medium containing a substratum which maintains operative the enzyme systems of said glands, and cortexone.

3. A process in accordance with claim 1, wherein the substratum belongs to the cyclophorase system.

4. A process in accordance with claim 1, wherein there are employed as substrata compounds those belonging to the citric acid cycle.

5. A process according to claim 1, wherein fumaric acid is employed in the substratum.

6. A process according to claim 1, wherein adenosine triphosphoric acid is employed in the substratum.

7. A process according to claim 1, wherein nicotinic acid amide is employed in the substratum.

References Cited in the file of this patent

UNITED STATES PATENTS

| 1,515,976 | Stem | Nov. 18, 1924 |
| 2,658,022 | Haines et al | Nov. 3, 1953 |
| 2,671,752 | Zaffaroni | Mar. 9, 1954 |
| 2,676,904 | Jeanloz et al. | Apr. 17, 1954 |

FOREIGN PATENTS

| 503,509 | Belgium | Nov. 26, 1951 |

OTHER REFERENCES

McGinty et al.: Science, volume 112, October 27, 1950, page 506.